US012191600B2

(12) United States Patent
Schrafl et al.

(10) Patent No.: US 12,191,600 B2
(45) Date of Patent: Jan. 7, 2025

(54) PLUG-IN MODULE FOR A RAIL-MOUNTED DEVICE, AND RAIL-MOUNTED DEVICE

(71) Applicant: DEHN SE, Neumarkt i.d.OPf. (DE)

(72) Inventors: Julius Schrafl, Neumarkt (DE); Florian Gäck, Beilngries (DE)

(73) Assignee: DEHN SE, Neumarkt i.d.OPf. (DE)

( * ) Notice: Subject to any disclaimer, the term of this patent is extended or adjusted under 35 U.S.C. 154(b) by 589 days.

(21) Appl. No.: 17/597,632

(22) PCT Filed: Jul. 13, 2020

(86) PCT No.: PCT/EP2020/069796

§ 371 (c)(1),
(2) Date: Jan. 14, 2022

(87) PCT Pub. No.: WO2021/013614

PCT Pub. Date: Jan. 28, 2021

(65) Prior Publication Data

US 2022/0278487 A1 Sep. 1, 2022

(30) Foreign Application Priority Data

Jul. 19, 2019 (DE) ..................... 10 2019 210 748.6

(51) Int. Cl.
*H01R 13/62* (2006.01)
*H01R 13/432* (2006.01)
(Continued)

(52) U.S. Cl.
CPC ....... *H01R 13/6273* (2013.01); *H01R 13/432* (2013.01); *H01R 13/631* (2013.01); *H01R 13/633* (2013.01)

(58) Field of Classification Search
None
See application file for complete search history.

(56) References Cited

U.S. PATENT DOCUMENTS 5,674,088 A 10/1997 Roche et al. ................. 439/354
6,113,415 A * 9/2000 Bertsch ................ H01R 13/514 439/701
(Continued)

FOREIGN PATENT DOCUMENTS

DE 19527757 A1 9/1996 ........... H01R 13/436
DE 10 2004 043 469 B4 7/2007
(Continued)

OTHER PUBLICATIONS

International Search Report corresponding to PCT Application No. PCT/EP2020/069796, mailed Oct. 12, 2020 (German and English language document) (6 pages).
(Continued)

*Primary Examiner* — James Harvey
(74) *Attorney, Agent, or Firm* — Bodner & Bodner, PLLC; Christian P. Bodner; Gerald T. Bodner

(57) ABSTRACT

The invention provides a plug-in module (10) for a rail-mounted device (1), comprising a housing (G), which has a first axial end portion (10*a*) and a second axial end portion (10*b*); wherein, between the first axial end portion (10*a*) and the second axial end portion (10*b*), the housing (G) has a plurality of substantially planar side surfaces (S1, S2, B1, B2); also comprising a first resiliently elastic tongue (12), which is fitted on a first side surface (S1) of the housing (G); wherein the first resiliently elastic tongue (12) has a first axial end portion (12*a*), which is fitted on the housing (G), and a second axial end portion (12*b*), which can be moved in a resiliently elastic manner; wherein a first latching nose (12*c*) is formed between the first and second axial end portions (12*a*, 12*b*) and protrudes from the first side surface (S1) of the housing (G); and further comprising a first actuating element (16), which is mounted in a movable manner on the first side surface (S1) and can be moved from a first position (P1), in which it is arranged substantially
(Continued)

within the housing (G), into a second position (P2), in which it is located partly outside the housing (G) and is arranged in abutment against the second axial end portion (12*b*); wherein, in the second position (P2), the first latching nose (12*c*) can be moved into the housing (G) by a user applying a substantially lateral force (F1).

17 Claims, 3 Drawing Sheets

(51) Int. Cl.

| | |
|---|---|
| ***H01R 13/627*** | (2006.01) |
| ***H01R 13/631*** | (2006.01) |
| ***H01R 13/633*** | (2006.01) |

(56) References Cited

U.S. PATENT DOCUMENTS 6,254,418 B1 7/2001 Tharp et al.
2010/0268858 A1* 10/2010 Lee ....................... G06F 13/409 710/74
2013/0183846 A1* 7/2013 Kappla .............. H01R 13/6335 439/350
2018/0206351 A1 7/2018 Wu
2019/0027866 A1 1/2019 Wu
2022/0278487 A1* 9/2022 Schrafl ............... H01R 13/6273

FOREIGN PATENT DOCUMENTS

| | | |
|---|---|---|
| DE | 10 2009 004 346 A1 | 7/2010 |
| DE | 10 2011 118 524 A1 | 5/2013 |
| DE | 20 2006 021 210 U1 | 9/2013 |
| DE | 10 2014 102 733 B4 | 12/2015 |
| DE | 10 2016 102 071 B3 | 6/2017 |
| WO | 95/12905 A1 | 5/1995 |
| WO | 99/19954 A1 | 4/1999 |

OTHER PUBLICATIONS

An Office Action (in German), dated Feb. 21, 2024, issued by the European Patent Office for Applicant's related European Patent Application No. EP20743096.8.

* cited by examiner

PLUG-IN MODULE FOR A RAIL-MOUNTED DEVICE, AND RAIL-MOUNTED DEVICE

This application is a 35 U.S.C. § 371 National Stage Application of PCT/EP2020/069796, filed on Jul. 13, 2020, which claims the benefit of priority to Serial No. DE 10 2019 210 748.6, filed on Jul. 19, 2019 in Germany, the disclosures of which are incorporated herein by reference in their entirety.

PRIOR ART

The present invention relates to a plug-in module for a rail-mounted device and to a corresponding rail-mounted device.

There are a large number of electrical rail-mounted devices in existence which have removable electrical plug-in modules, usually of narrow width, which can be arranged in a parallel state one beside the other. In the case of such rail-mounted devices, increased pulling forces are often required in order to release the removable plug-in modules.

This gives rise to a series of disadvantages, inter alia poor handling of narrow plug-in modules of rectangular cross section which are arranged in a parallel state one beside the other along their broad-side surfaces. There is a risk here of a number of plug-in modules accidentally being pulled off simultaneously along their narrow-side surfaces and therefore of undesired interruptions occurring in adjacent signal circuits.

Furthermore, it is often the case that an additional tool is required in order to dismount the plug-in modules and, in addition, a protective cover has to be removed in order to enable dismounting.

The large amount of finger-pressure force which is necessary in order for it to be possible for a plug-in module to be pulled off along its narrow-side surfaces often requires repeated back and forth movement, along with a large amount of pressure being applied at the same time, in order for it to be possible for a plug-in module to be pulled out of the base part.

This also results in the components of the entire rail-mounted device, e.g. the plug-in contacts and the fastening mechanism on the carrying rail, being subjected to mechanical loading.

DE 10 2009 004 346 A1 discloses an adapter by means of which single-pole and multi-pole surge-protection devices designed in the form of plug-in modules are mounted on a circuit board in a terminal, wherein the adapter comprises a base with means which allow the interchangeable plug-in modules accommodated in the respective base to be connected electrically to the terminal-application circuit, and has at least two open-top chambers which are delimited by side walls and from the underside of which extends at least one mounting and adjustment extension which has a cross-sectional shape which is essentially complementary to an opening in the circuit board of the terminal. It is also the case that connection parts are led out outside the chamber region that can be occupied by the respective plug-in module, said connection parts allowing direct or indirect electrical connection to the circuit board. The chambers have interior contacts and mechanical fastening means for the respective plug-in module.

WO 99/19954 A1 discloses an adapter for current-collector rails, in particular for retaining installation devices in distribution boards, the adapter having a main body which consists of insulating material and in which contact means for drawing current from current-collector rails are arranged.

Since the plug-in modules described above are plug-in modules which have surge-current-resistant plug-in contacts, the pulling forces required for the plug-in module are increased in comparison with normal plug-in connections. The consequence of this is that it is necessary to apply an even greater gripping force between the forefinger and thumb in order to release the plug-in module from the base part.

As a result, the contact-surface areas on the finger spread out even more than in the case of normal plug-in modules which require normal pulling forces and this means that not just undesired contact, but also the pulling of the adjacent plug-in modules, is probable. This results in it being necessary, despite high finger-pressure force, for a sufficient amount of contact-surface area to be present for the forefinger and thumb in order thus to allow a normal person to apply the necessary pulling force.

The problem with known tool-free solutions is that the gripping surfaces are provided laterally on the plug-in module without any undercut for the fingers.

The already known and conventional practice of introducing structures, ribbing, etc., into the gripping surfaces in order to increase the frictional force reduces only to a very slight extent the amount of finger-pressure force necessary for pulling the plug-in module.

A considerable improvement, in contrast, would involve a gripping surface which has good ergonomic shaping and has the necessary gripping surface for the fingers, e.g. in the form of an undercut. Known solutions, however, only have rectilinear gripping surfaces without any effective undercuts. On account of this disadvantageous configuration, the necessary pulling force has to be applied solely by the finger-pressure force, so that the static friction between the finger and gripping surface on the plug-in module can be maintained for pulling purposes.

However, if a good-grip undercut were provided on the plug-in module, this would give rise to the problem of undercut elements which project beyond predetermined installation dimensions of rail-mounted devices preventing a protective cover from being mounted and not corresponding to the standard outer-casing configuration.

Against this background, there is a need to provide an improved plug-in module for a rail-mounted device and also a corresponding rail-mounted device.

DISCLOSURE OF THE INVENTION

The present invention relates to a plug-in module for a rail-mounted device as claimed in patent claim 1. The invention also relates to a rail-mounted device as claimed in patent claim 8.

Preferred developments of the present invention form the subject matter of the respective dependent claims.

The concept of the present invention is that the ability to move the at least one actuating element from the first position, in which it is arranged at least to some extent within the plug-in module, into the second position, in which it is arranged at least to some extent outside the plug-in module, provides the user with an advantageous actuating element which preferably has an undercut formed by the movement and advantageously allows, without any auxiliary tool being used, selective gripping and, with a comparatively small amount of force being applied, pulling of the plug-in module.

It is therefore possible for easily releasable locking between the plug-in module and base part to prevent the plug-in module from becoming detached, e.g. as a result of being subjected to vibration. The locking can be dimensioned to be stable enough to be able to compensate for forces resulting from, for example, a transfer of surge currents and not to lead to the plug-in module becoming detached. It is likewise possible for the plug-in module to be pulled without adjacent plug-in modules accidentally being unlocked and pulled along with it, this avoiding accidental interruptions in the adjacent signal paths.

According to a preferred development, the plurality of essentially planar side surfaces have a first and second narrow-side surface and a first and second broad-side surface, which are arranged essentially with a right-angled cross section.

Such dimensioning can achieve a high packing density comprising a plurality of plug-in modules in a rail-mounted device.

According to a preferred development, the plug-in module is also equipped with a second resiliently elastic tongue, which is fitted on a second side surface of the housing; wherein the second resiliently elastic tongue has a first axial end portion, which is fitted on the housing, and a second axial end portion, which can be moved in a resiliently elastic manner; wherein a second latching nose is formed between the first and second axial end portions and protrudes from the second side surface of the housing; and with a second actuating element, which is mounted in a movable manner on the second side and can be moved from a first position, in which it is arranged essentially within the housing, into a second position, in which it is located to some extent outside the housing and is arranged with abutment against the second axial end portion; wherein in the second position, by virtue of a user applying an essentially lateral force to the second actuating element, the second latching nose can be moved into the housing.

This increases the stability of the latching in the rail-mounted device.

According to a preferred development, the first side surface is the first narrow-side surface and the second side surface is the second narrow-side surface.

This further increases the packing density which can be achieved.

According to a further preferred development, the first and/or latching nose are/is of essentially wedge-shaped design.

This provides for stable and straightforward latching.

According to a further preferred development, the first and/or second actuating element are/is of essentially wedge-shaped design, wherein, in the respective first position, a respective pointed end portion of the first and/or second actuating element is arranged in the direction of the first axial end portion of the housing, and wherein, in the respective second position of the first and/or second actuating element, the respective pointed end portion of the first and/or second actuating element is arranged in the direction of the second axial end portion of the housing.

This shaping means that, in the respective second position, the first and/or second actuating elements provide/provides effective undercuts which make it easier for the plug-in module, in the unlocked state, to be pulled out.

According to a further preferred development, the first and/or second actuating element can be pivoted about a respective pivot pin. This can be easily implemented.

BRIEF DESCRIPTION OF THE DRAWINGS

To give a better understanding of the present invention and the advantages thereof, reference will now be made to the following description in conjunction with the associated drawings.

The invention will be explained in more detail hereinbelow with reference to exemplary embodiments which are indicated in the schematic figures of the drawings, in which.

Unless indicated to the contrary, like reference signs denote like elements in the drawings.

Figure 1:
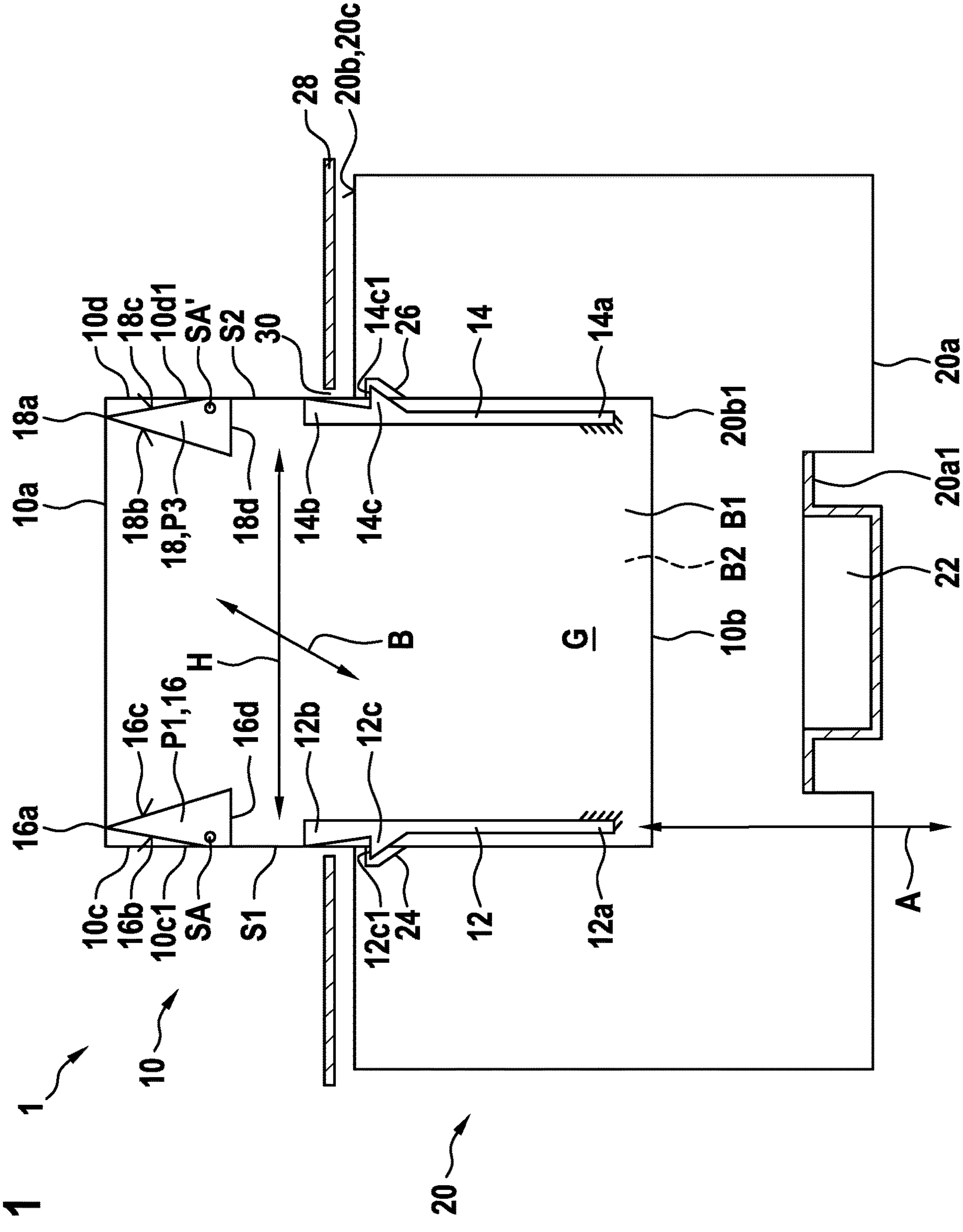
FIG. 1 shows a cross-sectional view of a rail-mounted device according to a preferred embodiment of the invention in the locked position.

The rail-mounted device 1 has a base part 20 and at least one electrical plug-in module 10 inserted into the base part 20. The plug-in module 10 comprises a housing G, which has essentially rectangular cross sections in its height direction H and in its width direction B. A first and a second essentially planar narrow-side surface are denoted by reference signs S1, S2 and a first and a second essentially planar broad-side surface are denoted by reference signs B1, B2 (above and beneath the drawing plane). A first axial end portion 10*a* of the plug-in module 10 is located on an operator's side, and a second axial end portion 10*b* of the plug-in module 10 is arranged in the interior of the base part 20.

For example operating elements (not illustrated) are arranged on the first axial end portion 10*a* and electrical contact elements (not illustrated) are arranged on the second axial end portion.

For example, the electrical plug-in module 10 is a surge-protection module or a fuse module.

The base part 20 has a first aperture 20*a*1, which is formed on a first side 20*a* and is intended for accommodating a carrying rail 22, and also has a second aperture 20*b*1, which is formed on a second side 20*b*, arranged opposite the first side 20*a*, and is intended for accommodating the at least one plug-in module 10 with locking action.

Not illustrated in the figures are busbars which are provided in the interior of the base part 20 and are connected electrically to the contact elements of the plug-in module 10.

The base part 20 is typically configured such that a plurality of plug-in modules 10 can be accommodated in the base part 20 in an arrangement in which they are in a parallel state one beside the other along the broad-side surfaces B1, B2.

In the case of the present embodiment, the plug-in module 10 has, on the opposite narrow-side surfaces S1, S2, a first resiliently elastic tongue 12, which is fastened in the plug-in module 10 and has a first wedge-shaped latching nose 12*c*, and a second resiliently elastic tongue 14, which is fastened in the plug-in module 10 and has a second wedge-shaped latching nose 14*c*.

In particular, the first resiliently elastic tongue 12 has a first axial end portion 12*a*, which is anchored in the plug-in module 10, and a second axial end portion 12*b*, which can be moved. The second resiliently elastic tongue 14 has a first axial end portion 14*a*, which is anchored in the plug-in module 10, and a second axial end portion 14*b*, which can be moved. Reference sign A here denote the axial direction of the first and second resiliently elastic tongues 12, 14.

The first latching nose 12*c* is located in the vicinity of the second axial end portion 12*b* of the first resiliently elastic tongue 12, and the second latching nose 14*c* is located in the vicinity of the second axial end portion 14*b* of the first resiliently elastic tongue 14. The first and second latching noses 12*c*, 14*c* protrude laterally from the narrow-side surfaces S1, S2.

A respective short side 12*c*1, 14*c*1 of the first and second latching noses 12*c* and 14*c*, respectively, is arranged in the direction of the second axial end portion 12*b*, 14*b* of the respective elastically resilient tongues 12, 14.

The first latching nose 12*c* is inserted into a first undercut 24, which is formed in the base part 20. The second latching nose 14*c* is inserted into a second undercut 26, which is formed in the base part 20.

For this purpose, the first undercut 24 and the first latching nose 12*c*, and also the second undercut 26 and the second latching nose 14*c*, of the base part 20 are of essentially complementary wedge-shaped design.

With the plug-in module 10 in the locked state in the base part 20, the short side 12*c*1 of the first latching nose 12*c* of the first resiliently elastic tongue 12 butts against a short side 24*a* of the first undercut 24 of the base part 20.

Likewise, with the plug-in module 10 in the locked state in the base part 20, the short side 14*c*1 of the second latching nose 14*c* of the second resiliently elastic tongue 14 butts against a short side 26*a* of the second undercut 26 of the base part 20.

This makes it possible to achieve stable locking of the plug-in module 10 in the base part 20.

In the assembled state of the rail-mounted device 1, which is shown in FIG. 1, a protective cover 28, which is arranged on an upper surface 20*c* of the base part 20, has an opening 30. The plug-in module 10 is guided through the opening 30.

The opening 30 of the protective cover 28 is essentially shape-adapted to the narrow-side surfaces S1, S2 of the plug-in module 10. Shape adaptation in the width direction B corresponds to the sum of the widths of the plug-in modules 10 which have been plugged in.

The plug-in module 10 also has, on its first narrow-side surface S1, a first actuating element 16, which is mounted in a pivotable manner in the plug-in module 10, and, on its second narrow-side surface S2, a second actuating element 18, which is mounted in a pivotable manner in the plug-in module 10.

The first actuating element 16 and the second actuating element 18 are of essentially wedge-shaped design. In a first position P1 of the first actuating element 16 and in a first position P3 of the second actuating element 18, a first end portion 16*a* of the first actuating element 16 and a first end portion 18*a* of the second actuating element 18 are arranged in the region of tapering side surfaces 16*b*, 16*c* of the first actuating element 16 and of tapering side surfaces 18*b*, 18*c* of the second actuating element 18 adjacent to the first axial end portion 10*a* of the plug-in module 10.

In the first position P1 of the first actuating element 16 and in the first position P3 of the second actuating element 18, a short side 16*d* of the first actuating element 16 and a short side 18*d* of the second actuating element 18 are directed toward a second axial end portion 10*b* of the plug-in module 10.

The first and second actuating elements 16, 18 can be pivoted and serve to unlock the first resiliently elastic tongue 12 with the first latching nose 12*c* and the second resiliently elastic tongue 14 with the second latching nose 14*c*, as will be explained at a later stage in the text.

A pivot pin SA of the first actuating element 16 is arranged adjacent to the short side 16*d* of the first actuating element 16 and a side wall 10*c*, as seen in the width direction B of the plug-in module 10. A pivot pin SA' of the second actuating element 18 is likewise arranged adjacent to the short side 18*d* of the second actuating element 18 and a side wall 10*d*, as seen in the width direction B of the plug-in module 10.

The pivot pins SA, SA' are fastened on opposite side walls of the broad-side surfaces B1, B2 (not illustrated in FIG. 1) of the plug-in module 10.

In the state which is illustrated in FIG. 1, the first and second actuating elements 16, 18 are incorporated, in the respective first position P1, P3, essentially within the plug-in module 10. Therefore, they do not prevent either the mounting/dismounting of the protective cover 28 or the arranging of plug-in modules 10 parallel one beside the other along their broad-side surfaces B1, B2.

Figure 2:
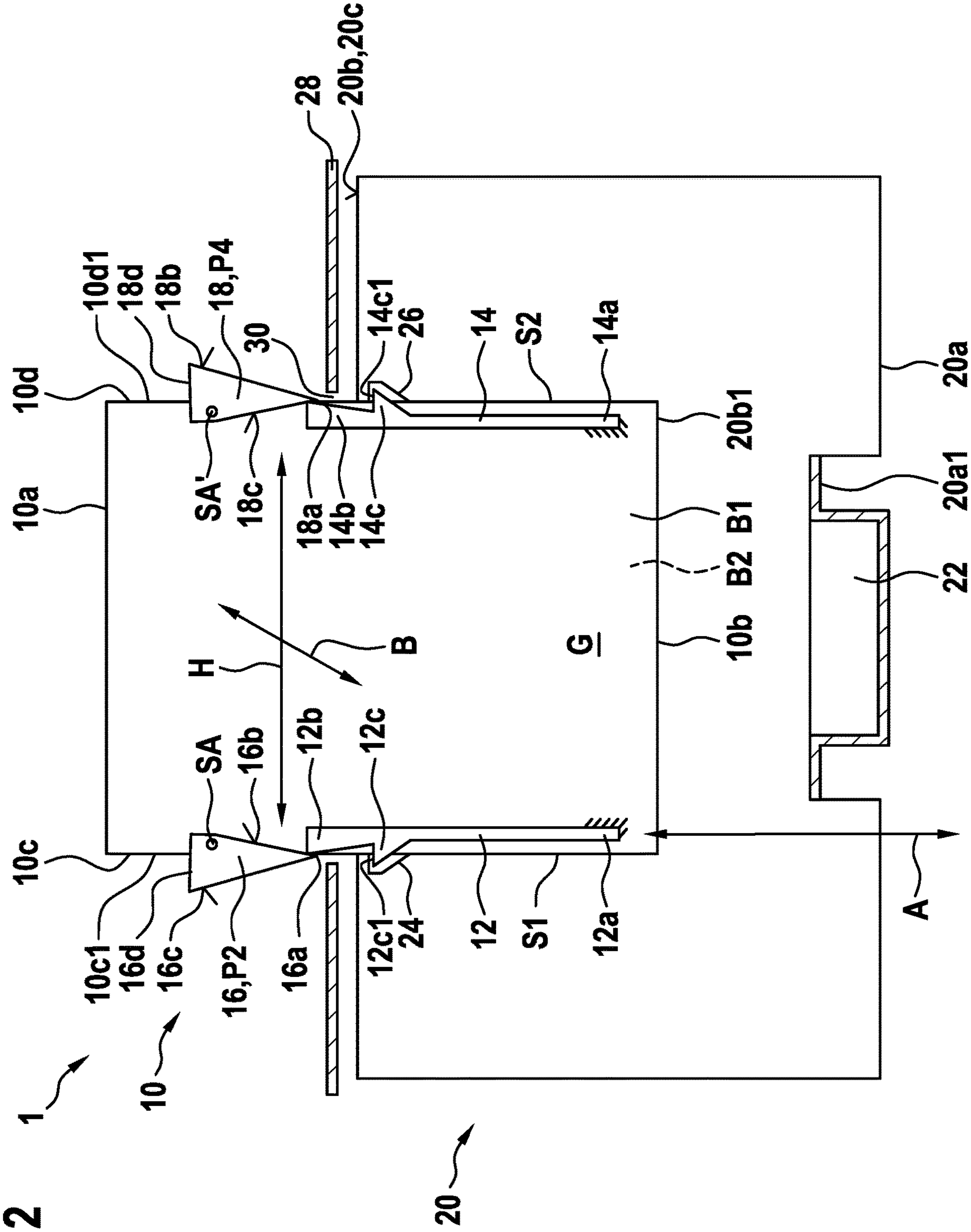
FIG. 2 shows a cross-sectional view of the rail-mounted device according to the preferred embodiment of the invention in a position in which it is ready for unlocking.

FIG. 2 shows a cross-sectional view of the rail-mounted device according to the preferred embodiment of the invention in a position in which it is ready for unlocking.

The first actuating element 16 can be pivoted from the first position P1, in which it is arranged entirely within the plug-in module 10, into a second position P2, in which the end portion 16*a* of the first actuating element 16 butts against the second axial end portion 12*b* of the first resiliently elastic tongue 12.

In the second position P2, the first actuating element 16 is arranged to some extent outside the plug-in module 10, wherein, on account of the wedge shape, the side surface 16*c* forms an undercut.

In the second position P2, by virtue of a user applying an essentially lateral force to the first actuating element 16, the first resiliently elastic tongue 12 can be moved essentially perpendicularly to its axial direction A.

The second actuating element 18 can be pivoted from the first position P3, in which it is arranged entirely within the plug-in module 10, into a second position P4, in which the end portion 18*a* of the second actuating element 18 butts against the second axial end portion 14*b* of the second resiliently elastic tongue 14.

In this second position P4, the second actuating element 18 is arranged to some extent outside the plug-in module 10, wherein, on account of the wedge shape, the side surface 18*b* forms an undercut.

In the second position P4, by virtue of a user applying an essentially lateral force to the second actuating element 18, the second resiliently elastic tongue 14 can be moved essentially perpendicularly to its axial direction A.

For this purpose, the respective side walls 10*c*, 10*d* on the narrow-side surfaces S1, S2 each have a cutout 10*c*1, 10*d*1. By way of the respective cutout 10*c*1, 10*d*1, in each case the first actuating element 16 and the second actuating element 18 can be pivoted between the first position P1, P3 and the second position P2, P4 and a third position P5, P6 (see text below).

In the respective second position P2, P4, the first actuating element 16 and the second actuating element 18 are thus pivoted essentially through 180° in relation to the respective first position P1, P3.

In the second position P2 of the first actuating element 16, the short side 16*d* of the first actuating element 16 is directed toward the first axial end portion 10*a* of the plug-in module 10.

Likewise, in the second position P4 of the second actuating element 18, the short side 18*d* of the second actuating element 18 is directed toward the first axial end portion 10*a* of the plug-in module 10.

It is advantageous, in the case of this embodiment, that the second axial end portion 12*b* of the first resiliently elastic tongue 12 and the second axial end portion 14*b* of the second resiliently elastic tongue 14 extend outwards in the axial direction A to the far side of the protective cover 28, and this means that the plug-in module 10 can be unlocked and dismounted without the protective cover being removed.

Figure 3:
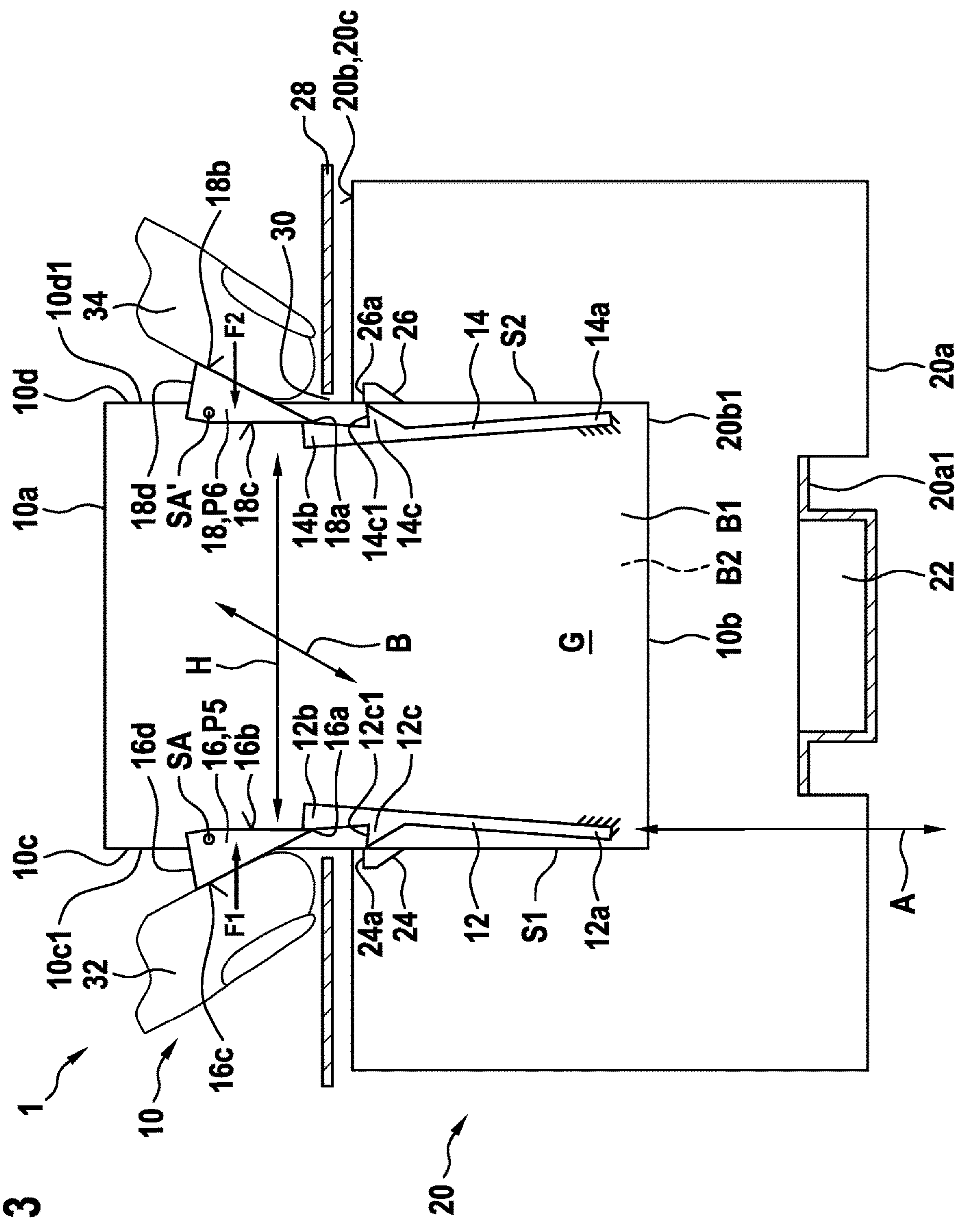
FIG. 3 shows a cross-sectional view of the rail-mounted device according to the preferred embodiment of the invention in the unlocked position.

FIG. 3 shows a cross-sectional view of the rail-mounted device according to the preferred embodiment of the invention in the unlocked position.

For the purpose of unlocking the plug-in module 10 in the base part 20, by virtue of the user using a first finger 32 to apply an essentially lateral force F1 to the first actuating element 16, the first latching nose 12*c* of the first resiliently elastic tongue 12 can be disengaged from the first undercut 24, which is formed in the base part 20, by the second axial end portion 12*b* of the first resiliently elastic tongue 12 being pushed into the interior of the plug-in module 10, and into a corresponding third position P5.

Likewise, for the purpose of unlocking the plug-in module 10 in the base part 20, by virtue of the user using a second finger 34 to apply an essentially lateral force F2 to the second actuating element 18, the latching nose 14*c* of the second resiliently elastic tongue 14 can be disengaged from the second undercut 26, which is formed in the base part 20, by the second axial end portion 14*b* of the second resiliently elastic tongue 14 being pushed into the interior of the plug-in module 10, and into a corresponding third position P6.

In this unlocked position, by virtue of the user applying an additional pulling force, the plug-in module 10 can be pulled out of the base part 20, wherein the wedge-shaped configuration of the first and second actuating devices 16, 18 provides the user with corresponding undercuts on the respective sides 16*c* and 18*b*, these undercuts making the pulling-out operation easier.

Although it is a specific embodiment which has been illustrated and described here, it is obvious to a person skilled in the art that there are a large number of alternative and/or equivalent implementations in existence. It should be noted that the exemplary embodiment or exemplary embodiments is/are only examples and does/do not serve to limit the scope, the applicability or the configuration in any way.

Although the actuating element or elements in the above-described embodiments have been illustrated as being capable of pivoting, the invention is not restricted thereto. Rather, it is also possible for the actuating element or elements to be capable of linear movement or combined rotary and linear movement.

It is also possible for the actuating element or elements to be fixed in the first position by latching elements, in order in this way to prevent undesired movement.

Instead of the wedge shape described for the actuating elements, basically any other desired geometries are possible, e.g. stepped formations, roughened surfaces, apertures, etc.

In the case of further embodiments, it is also possible for the elastic tongues themselves to function as movable actuating elements.

The latching noses and complementary overlaps can likewise have geometries other than those described above, for example slanting, rather than horizontal, short sides.

The invention claimed is:

1. A plug-in module for a rail-mounted device:

having a housing, which has a first axial end portion and a second axial end portion;

wherein, between the first axial end portion and the second axial end portion, the housing has a plurality of essentially planar side surfaces;

having a first resiliently elastic tongue, which is fitted on a first side surface of the housing;

wherein the first resiliently elastic tongue has a first axial end portion, which is fitted on the housing, and a second axial end portion, which can be moved in a resiliently elastic manner;

wherein a first latching nose is formed between the first and second axial end portions and protrudes from the first side surface of the housing;

and having a first actuating element, which is mounted in a movable manner on the first side surface and can be moved from a first position, in which it is arranged essentially within the housing, into a second position, in which it is located to some extent outside the housing and is arranged in abutment against the second axial end portion;

wherein in the second position, by virtue of a user applying an essentially lateral force to the first actuating element, the first latching nose can be moved into the housing.

2. The plug-in module as claimed in claim 1, wherein the plurality of essentially planar side surfaces have a first and second narrow-side surface and a first and second broad-side surface, which are arranged essentially with a right-angled cross section.

3. The plug-in module as claimed in claim 1, also having a second resiliently elastic tongue, which is fitted on a second side surface of the housing;

wherein the second resiliently elastic tongue has a first axial end portion, which is fitted on the housing, and a second axial end portion, which can be moved in a resiliently elastic manner;

wherein a second latching nose is formed between the first and second axial end portions and protrudes from the second side surface of the housing;

and having a second actuating element, which is mounted in a movable manner on the second side and can be moved from a first position, in which it is arranged essentially within the housing, into a second position, in which it is located to some extent outside the housing and is arranged in abutment against the second axial end portion;

wherein in the second position, by virtue of a user applying an essentially lateral force to the second actuating element, the second latching nose can be moved into the housing.

4. The plug-in module as claimed in claim 3, wherein the first side surface is the first narrow-side surface and the second side surface is the second narrow-side surface.

5. The plug-in module as claimed in claim 1, wherein the first and/or latching nose are/is of essentially wedge-shaped design.

6. The plug-in module as claimed in claim 1, wherein the first and/or second actuating element are/is of essentially wedge-shape design, and wherein, in the respective first position, a respective pointed end portion of the first and/or second actuating element is arranged in the direction of the first axial end portion of the housing, and wherein, in the respective second position of the first and/or second actuating element, the respective pointed end portion of the first and/or second actuating element is arranged in the direction of the second axial end portion of the housing.

7. The plug-in module as claimed in claim 1, wherein the first and/or second actuating element can be pivoted about a respective pivot pin.

8. A rail-mounted device having a base part and at least one plug-in module, wherein the plug-in module is equipped:

with a housing, which has a first axial end portion and a second axial end portion;

wherein, between the first axial end portion and the second axial end portion, the housing has a plurality of essentially planar side surfaces;

with a first resiliently elastic tongue, which is fitted on a first side surface of the housing;

wherein the first resiliently elastic tongue has a first axial end portion, which is fitted on the housing, and a second axial end portion, which can be moved in a resiliently elastic manner;

wherein a first latching nose is formed between the first and second axial end portions and protrudes from the first side surface of the housing;

and with a first actuating element, which is mounted in a movable manner on the first side surface and can be moved from a first position, in which it is arranged essentially within the housing, into a second position, in which it is located to some extent outside the housing and is arranged in abutment against the second axial end portion;

wherein in the second position, by virtue of a user applying an essentially lateral force to the first actuating element, the first latching nose can be moved into the housing;

wherein the base part has a first aperture, which is formed on a first side and is intended for accommodating a carrying rail, and also has a second aperture, which is formed on a second side, arranged opposite the first side, and is intended for accommodating the at least one plug-in module;

wherein the base part has a first undercut, into which the first latching nose has been inserted with locking action in the plugged-in state.

9. The rail-mounted device as claimed in claim 8, wherein the plurality of essentially planar side surfaces have a first and second narrow-side surface and a first and second broad-side surface, which are arranged essentially with a right-angled cross section.

10. The rail-mounted device as claimed in claim 8, wherein the plug-in module is also equipped:

a second resiliently elastic tongue, which is fitted on a second side surface of the housing;

wherein the second resiliently elastic tongue has a first axial end portion, which is fitted on the housing, and a second axial end portion, which can be moved in a resiliently elastic manner;

wherein a second latching nose is formed between the first and second axial end portions and protrudes from the second side surface of the housing;

a second actuating element, which is mounted in a movable manner on the second side and can be moved from a first position, in which it is arranged essentially within the housing into a second position, in which it is located to some extent outside the housing and is arranged in abutment against the second axial end portion;

wherein in the second position, by virtue of a user applying an essentially lateral force to the second actuating element, the second latching nose can be moved into the housing;

wherein the base part has a second undercut, into which the second latching nose has been inserted with locking action in the plugged-in state.

11. The rail-mounted device as claimed in claim 10, wherein the first side surface is the first narrow-side surface and the second side surface is the second narrow-side surface.

12. The rail-mounted device as claimed in claim 11, wherein a plurality of the plug-in modules can be inserted with locking action in the base part with the broad-side surfaces parallel.

13. The rail-mounted device as claimed in claim 8, wherein the first and/or latching nose are of essentially wedge-shaped design and the first and/or second undercut are/is of complementary wedge-shaped design.

14. The rail-mounted device as claimed in claim 8, wherein the first and/or second actuating element are/is of essentially wedge-shape design, and wherein, in the respective first position, a respective pointed end portion of the first and/or second actuating element is arranged in the direction of the first axial end portion of the housing, and wherein, in the respective second position of the first and/or second actuating element, the respective pointed end portion of the first and/or second actuating element is arranged in the direction of the second axial end portion of the housing.

15. The rail-mounted device as claimed in claim 8, wherein the rail-mounted device has a protective cover, which is fitted on an upper surface of the base part and has an opening, through which the at least one plug-in module can be guided in the respective first position, wherein the protective cover is shape-adapted to the housing.

16. The rail-mounted device as claimed in claim 7 wherein the respective third position can be reached with the protective cover fitted.

17. The rail-mounted device as claimed in claim 8, wherein the first and/or second actuating element can be pivoted about a respective pivot pin.

* * * * *